(12) United States Patent
Van Nieuwenhuyze et al.

(10) Patent No.: US 10,931,519 B2
(45) Date of Patent: Feb. 23, 2021

(54) CONFIGURATION OF NFC ROUTERS FOR P2P COMMUNICATION

(71) Applicants: Proton World International N.V., Zaventem (BE); STMicroelectronics (Rousset) SAS, Rousset (FR)

(72) Inventors: Olivier Van Nieuwenhuyze, Wezembeek-Oppem (BE); Alexandre Charles, Auriol (FR)

(73) Assignees: PROTON WORLD INTERNATIONAL N.V., Zaventem (BE); STMICROELECTRONICS (ROUSSET) SAS, Rousset (FR)

( * ) Notice: Subject to any disclaimer, the term of this patent is extended or adjusted under 35 U.S.C. 154(b) by 502 days.

(21) Appl. No.: 14/971,552

(22) Filed: Dec. 16, 2015

(65) Prior Publication Data

US 2016/0105309 A1    Apr. 14, 2016

Related U.S. Application Data

(63) Continuation of application No. 14/176,959, filed on Feb. 10, 2014, now Pat. No. 9,277,577.

(30) Foreign Application Priority Data

Feb. 12, 2013   (FR) ...................... 13/51172

(51) Int. Cl.
| | | |
|---|---|---|
| *H04L 12/24* | (2006.01) | |
| *H04B 5/00* | (2006.01) | |
| *H04B 5/02* | (2006.01) | |
| *H04W 4/80* | (2018.01) | |
| *H04W 76/14* | (2018.01) | |
| *H04L 29/08* | (2006.01) | |

(52) U.S. Cl.
CPC ....... *H04L 41/0803* (2013.01); *H04B 5/0031* (2013.01); *H04B 5/02* (2013.01); *H04L 67/104* (2013.01); *H04W 4/80* (2018.02); *H04W 76/14* (2018.02)

(58) Field of Classification Search
CPC combination set(s) only.
See application file for complete search history.

(56) References Cited

U.S. PATENT DOCUMENTS

| | | |
|---|---|---|
| 6,617,962 B1 | 9/2003 | Horwitz et al. |
| 7,046,121 B2 | 5/2006 | Wuidart |
| 7,128,274 B2 | 10/2006 | Kelley et al. |
| 7,298,258 B1 | 11/2007 | Hudgens et al. |

(Continued)

FOREIGN PATENT DOCUMENTS

| | | |
|---|---|---|
| DE | 10 2009 045 186 A1 | 4/2011 |
| EP | 2 518 982 A1 | 10/2012 |
| WO | 2013/163002 A1 | 10/2013 |

OTHER PUBLICATIONS

Roland Minihold, "Near Field Communication (NFC) Technology and Measurements White Paper", Jun. 2011.*

(Continued)

*Primary Examiner* — Zhiyu Lu
(74) *Attorney, Agent, or Firm* — Seed IP Law Group LLP

(57) ABSTRACT

A method for configuring a first device for a near-field communication with a second device, wherein a peer-to-peer mode is selected if the second device draws the power supply of its circuits from a battery.

11 Claims, 3 Drawing Sheets

(56) References Cited

U.S. PATENT DOCUMENTS

| | | | |
|---|---|---|---|
| 8,436,718 B2 | 5/2013 | Goto et al. | |
| 8,514,688 B2 | 8/2013 | Fujii et al. | |
| 8,515,345 B2 | 8/2013 | Takayama | |
| 8,553,666 B2 | 10/2013 | Palm et al. | |
| 8,559,875 B2 | 10/2013 | Takayama | |
| 8,840,030 B2 | 9/2014 | Kelley et al. | |
| 8,874,033 B2 | 10/2014 | Takayama | |
| 8,964,787 B2 | 2/2015 | McMullin et al. | |
| 8,994,510 B2 | 3/2015 | Restiau | |
| 9,331,744 B2 | 5/2016 | Hillan et al. | |
| 9,513,609 B2 | 12/2016 | Thueringer et al. | |
| 9,661,667 B2 | 5/2017 | Asakura | |
| 9,754,919 B2 | 9/2017 | Kuroda et al. | |
| 9,900,052 B2 | 2/2018 | Teruyama | |
| 2005/0077356 A1* | 4/2005 | Takayama | G06K 7/10237 235/451 |
| 2006/0046736 A1 | 3/2006 | Pering et al. | |
| 2006/0245402 A1* | 11/2006 | Fujii | H04B 5/0056 370/338 |
| 2007/0008140 A1 | 1/2007 | Saarisalo et al. | |
| 2007/0026825 A1 | 2/2007 | Wilson | |
| 2007/0030116 A1 | 2/2007 | Feher | |
| 2007/0136473 A1 | 6/2007 | Birchler et al. | |
| 2007/0236336 A1 | 10/2007 | Borcherding | |
| 2008/0088366 A1 | 4/2008 | Nakadai et al. | |
| 2008/0143488 A1 | 6/2008 | Yamamoto et al. | |
| 2008/0232405 A1 | 9/2008 | Gallo | |
| 2009/0247077 A1 | 10/2009 | Sklovsky et al. | |
| 2009/0251291 A1 | 10/2009 | Borcherding | |
| 2010/0190436 A1 | 7/2010 | Cook et al. | |
| 2010/0259390 A1 | 10/2010 | Borcherding | |
| 2010/0295780 A1 | 11/2010 | Vaisanen | |
| 2011/0111778 A1 | 5/2011 | Son et al. | |
| 2011/0300800 A1* | 12/2011 | Wuidart | G06K 19/0701 455/41.1 |
| 2012/0105012 A1* | 5/2012 | Wuidart | G06K 19/0701 320/137 |
| 2012/0175967 A1* | 7/2012 | Dibben | H01F 38/14 307/104 |
| 2012/0252363 A1* | 10/2012 | Zhang | H04B 5/0031 455/41.1 |
| 2012/0296986 A1 | 11/2012 | Hassan et al. | |
| 2013/0040576 A1 | 2/2013 | Yoon | |
| 2013/0062959 A1* | 3/2013 | Lee | H02J 5/005 307/104 |
| 2013/0069779 A1 | 3/2013 | Vitucci | |
| 2013/0140906 A1* | 6/2013 | Tanabe | H02J 17/00 307/104 |
| 2013/0196594 A1* | 8/2013 | Moosavi | H04B 5/00 455/41.1 |
| 2013/0203346 A1 | 8/2013 | Han | |
| 2013/0203347 A1* | 8/2013 | Moosavi | H04B 5/02 455/41.1 |
| 2013/0223280 A1 | 8/2013 | Choi et al. | |
| 2013/0332756 A1 | 12/2013 | Kim et al. | |
| 2014/0203656 A1* | 7/2014 | Yamaguchi | H02J 5/005 307/104 |
| 2014/0206284 A1 | 7/2014 | Naniyat | |
| 2014/0342665 A1 | 11/2014 | Amano | |
| 2014/0354066 A1 | 12/2014 | Watanabe et al. | |
| 2014/0357190 A1* | 12/2014 | Bouvet | H04B 5/0093 455/41.1 |
| 2015/0061587 A1 | 3/2015 | Bruechmann et al. | |

OTHER PUBLICATIONS

French Search Report and Written Opinion, dated Nov. 18, 2013, for corresponding French Application No. 13/51172.

French Search Report and Written Opinion, dated Nov. 29, 2012, for French Application No. 12/54568, 6 pages.

\* cited by examiner

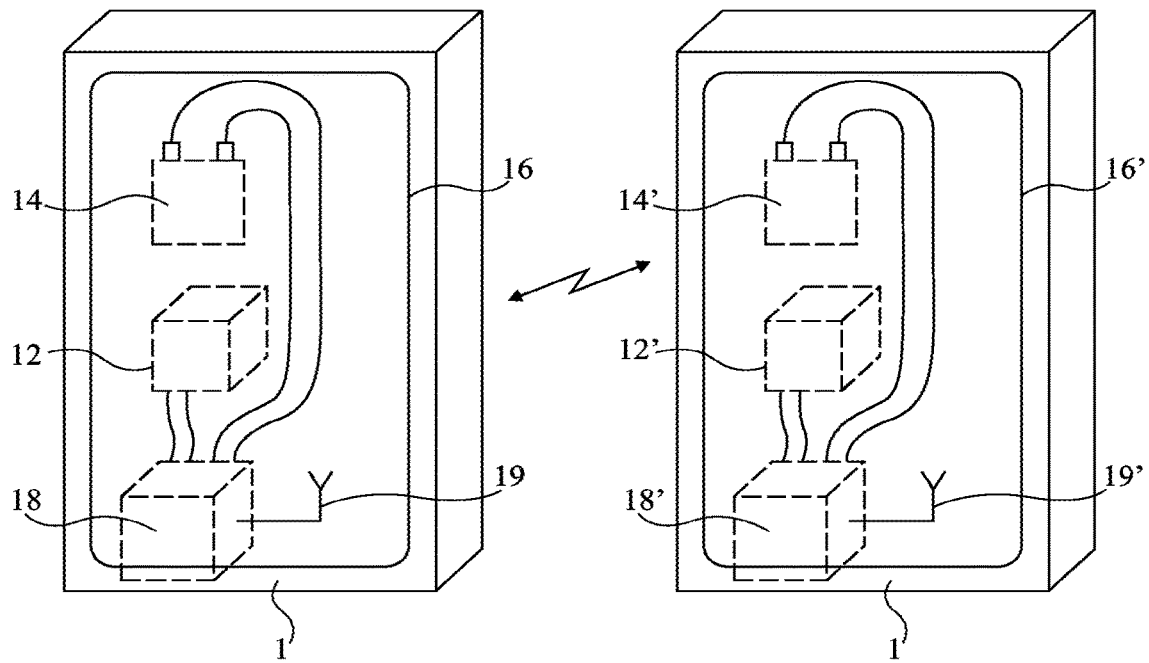
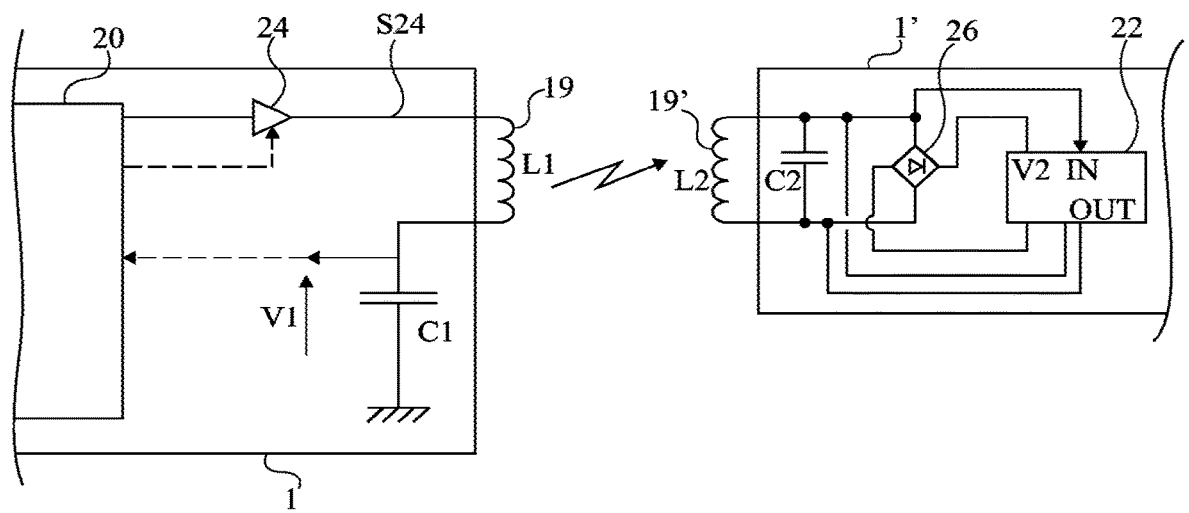
Fig 1
Fig 2

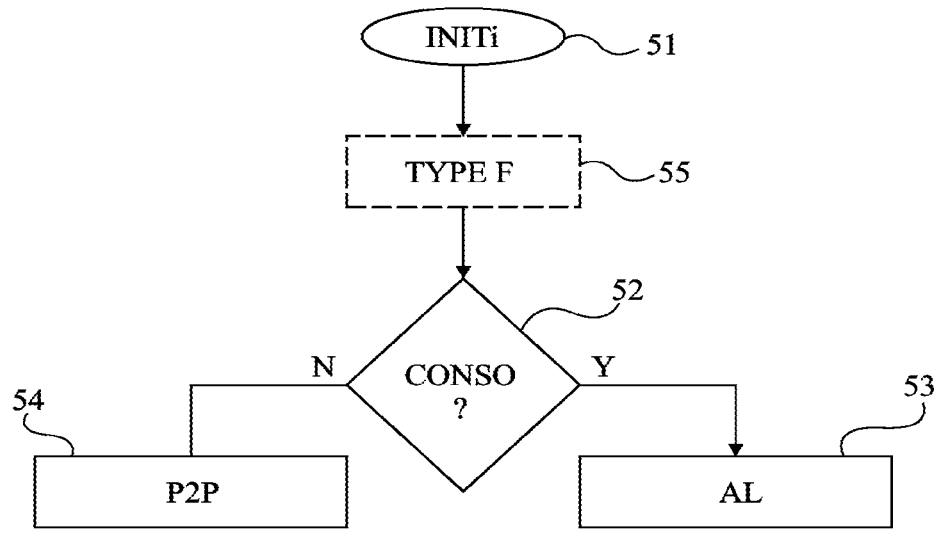
Fig 5
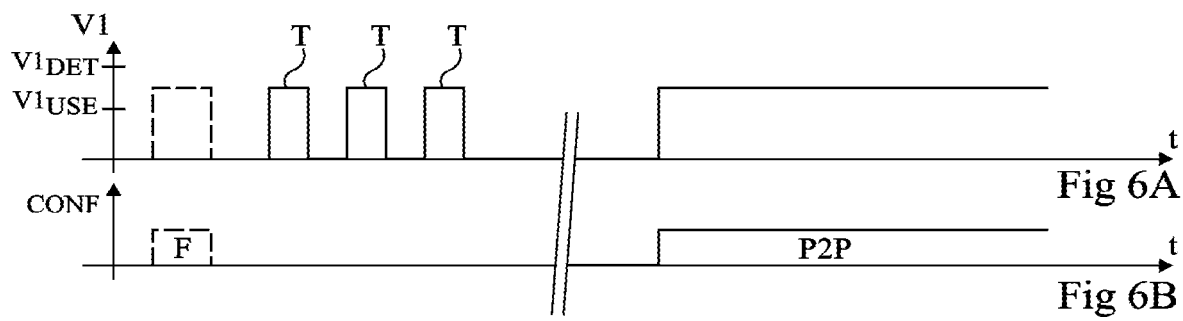
Fig 6A
Fig 6B
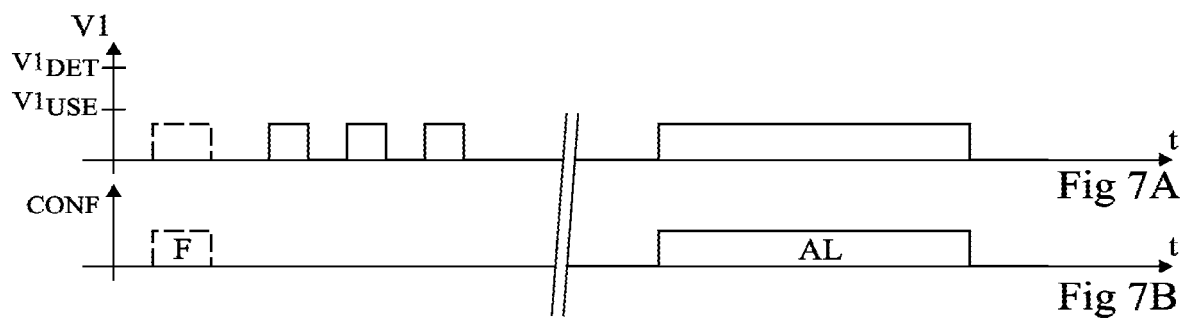
Fig 7A
Fig 7B

CONFIGURATION OF NFC ROUTERS FOR P2P COMMUNICATION

CROSS REFERENCE TO RELATED APPLICATION

This application claims priority to French Patent Application No. 13/51172, filed Feb. 12, 2013, which is hereby incorporated by reference to the maximum extent allowable by law.

BACKGROUND

Technical Field

The present disclosure generally relates to near-field communication systems and, more specifically, to the configuration of near-field communication devices for P2P (peer to peer) transmissions.

Discussion of the Related Art

More and more portable devices (smartphones, touch pads, etc.) are equipped with near-field communication devices (NFC).

Most often, such portable devices are capable of operating in two modes, respectively called card mode and reader mode. In card mode, the device operates as a contactless chip card to communicate with a near-field communication terminal (for example, another mobile device operating in reader mode). In reader mode, the device operates as a terminal and is capable of reading contactless cards (or another device operating in card mode), just as an electromagnetic transponder reader.

Electromagnetic transponder systems used in near-field communications are now well known. Their operation is based on the emission of a radio frequency radiation by the terminal or the reader to communicate with, and possibly to remotely supply, a transponder present in the field of the terminal. The transponder, when it is within the terminal range, captures this field and communicates by modulating the load that it forms on this field. A transponder is within the range when it is capable of exploiting the field, and possibly of extracting from this field a power sufficient for the operation of the circuits comprised therein. The terminal and the transponder are generally tuned to a same frequency.

When the device operates in reader mode, it most often has to remotely supply the transponder located within its range and with which it desires to communicate. Now, there exist different natures of transponders, from the simple passive electronic tag to more advanced transponders equipped with microprocessors. A transmission between a reader and a transponder thus generally begins with a search for the type of communication to be established between the two devices, that is, the communication standard to be respected.

The availability of devices capable of communicating in near field provides another possibility of communication, the peer-to-peer file exchange. Such a communication is performed according to an ISO-18092 (or ECMA 340; or NFC-Forum Digital Protocol) standard and is generally called F-type modulation. However, present processes for configuring an NFC device according to the type of modulation according to which it is to communicate may not be capable of detecting a need for a peer-to-peer communication.

SUMMARY

An embodiment overcomes all or part of the disadvantages of usual techniques for configuring a mobile near-field communication device according to the type of modulation according to which it is to communicate.

Another embodiment provides a configuration method capable of detecting a peer-to-peer communication need.

Another embodiment provides a solution compatible with usual processes for determining the communication type.

An embodiment provides a method for configuring a first device for a near-field communication with a second device, wherein a peer-to-peer mode is selected if the second device draws the power supply of its circuits from a battery.

According to an embodiment, the first device measures information representative of the current in an oscillating circuit for generating the field and compares it with a first threshold.

According to an embodiment, the peer-to-peer mode is selected if the value of said information is higher than said first threshold.

According to an embodiment, the peer-to-peer mode is selected if, further, the value of said information is higher than a second threshold higher than the first threshold.

According to an embodiment, if the value of said information is lower than said first threshold, the first device emits frames according to different modulation types and monitors the response of the second device.

According to an embodiment, the first device is initially configured for a communication according to an F-type modulation.

A device equipped with a near-field communication circuit, capable of implementing the method, is also provided.

The foregoing and other features and advantages will be discussed in detail in the following non-limiting description of specific embodiments in connection with the accompanying drawings.

BRIEF DESCRIPTION OF THE DRAWINGS

FIG. 1 is a simplified view of a system of peer-to-peer communication by means of mobile near-field communication devices of the type to which the embodiments which will be described apply;

FIG. 2 is a simplified representation of a reader and of a transponder used in a near-field communication;

FIG. 5 illustrates, in the form of a block diagram, an embodiment of a configuration method capable of detecting a peer-to-peer communication need;

FIGS. 6A and 6B illustrate the operation of the method of FIG. 5 in the absence of a peer-to-peer communication need;

FIGS. 7A and 7B illustrate the operation of the method of FIG. 5 in the presence of a peer-to-peer communication need.

DETAILED DESCRIPTION

Figure 3A:
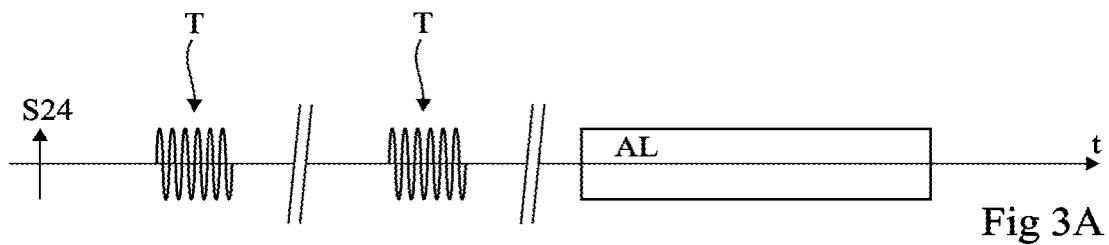
FIGS. 3A and 3B are timing diagrams illustrating the configuration of a reader on a modulation type.

The same elements have been designated with the same reference numerals in the different drawings, which have been drawn out of scale. For clarity, only those steps and elements which are useful to the understanding of the embodiments which will be described have been shown and will be detailed. In particular, the circuits for generating communication frames according to the different standards (or types) have not been detailed, the described embodiments being compatible with usual standards. Further, the generation of polling requests by a near-field communication device has not been detailed either, the described embodiments being here again compatible with usual devices.

FIG. 1 very schematically shows an example of a near-field communication system of the type to which the embodiments which will be described apply. In this example, two mobile devices 1 and 1', of smartphone or tablet type, are capable of communicating with each other in near field mode. In a very simplified manner, these devices comprise various electronic circuits symbolized by a block 12 or 12' in dotted lines, a battery 14 or 14' for powering these circuits and peripherals (for example, a touch screen 16 or 16') and a near-field communication circuit 18 or 18' (NFC router) connected to an antenna 19 or 19'. The representation of FIG. 1 is very simplified and other circuits, pieces of equipment, or interfaces may equip devices 1 and 1'.

FIG. 2 is a partial simplified representation of devices 1 and 1' illustrating the operation, considering that device 1 acts as a terminal or reader and that device 1' acts as a transponder (card). Terminal 1 generates an electromagnetic field for transponders 1' capable of being present in this field and of capturing this field to establish a communication with the reader.

Reader 1 comprises various electronic circuits (symbolized by a block 20 in FIG. 2) for processing the data to be transmitted and received (circuits 12 and 18, FIG. 1), and for generating a radio frequency signal (for example, at the 13.56-MHz frequency) intended to be amplified by an amplifier 24 before driving an oscillating circuit (antenna 19 or inductive element L1 and capacitive element C1). In the example of FIG. 1, a series oscillating circuit is assumed, inductive elements L1 and capacitive element C1 being series-connected between the output of amplifier 24 and the ground. The representation of FIG. 1 is simplified on the reader side and other circuits may be present.

The oscillating circuit of reader 1 generates a high-frequency electromagnetic field capable of being captured by transponders 1' present in this field.

A transponder 1' generally comprises a resonant circuit, formed of an antenna or inductance L2 and of a capacitive element C2, most often, in parallel. For an operation in card mode, remotely supplied by the terminal, the voltage across this oscillating circuit is rectified (rectifying bridge 26) to generate a D.C. voltage V2 for powering the various circuits (symbolized by a block 22 in FIG. 2) of the transponder (circuits 12' and 18', FIG. 1). Further, the radio frequency signal, or an image thereof, is sampled towards block 22 (input IN) to demodulate the messages received from the terminal and interpret them. The transmission, in the transponder-to-reader direction, is performed by modulating the load formed by the transponder circuits on the electromagnetic field generated by the reader. It is generally spoken of a retromodulation (most often resistive or capacitive). Such a retromodulation is symbolized in FIG. 1 by an output OUT of circuit 22 connected across the oscillating circuit.

The oscillating circuit of the device operating in reader mode (for example, 1) generates a high-frequency electromagnetic field capable of being sensed by the transponder(s) 1' present in this field. The transmission in the reader-to-transponder direction is performed by modulating the carrier amplitude. The transmission, in the transponder-to-reader direction, is performed by modulating the load formed by the transponder circuits on the electromagnetic field generated by the reader.

The general operation of an electromagnetic transponder system is known and will not be detailed any further.

Generally, as long as no transponder (or device in card mode) has been detected in the field of the terminal (or device in reader mode), the latter periodically emits a polling frame. Indeed, it is not desirable for the reader to permanently emit for obvious power consumption reasons. Between polling frames, the device in reader mode may also switch to the card mode in order to, in case another device is present, respond thereto.

Figure 3B:
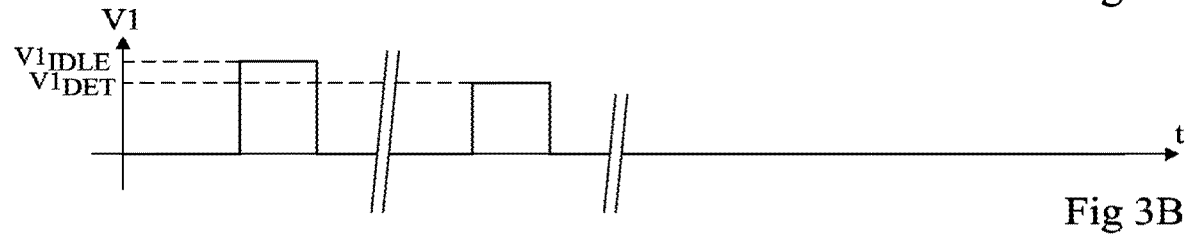

FIGS. 3A and 3B are timing diagram illustrating the operation of the system during such polling frames T and for the configuration of the communication type.

Frames T comprise, for reader 1, periodically emitting a train of alternations of the radio frequency carrier (for example, 13.56 MHz) with no modulation (signal S24 at the output of amplifier 24, FIG. 2). The frame duration is relatively short (typically, approximately ranging from 1 to 2 μs).

If no transponder is present in the field (left-hand portion of the timing diagrams of FIGS. 3A and 3B), the electromagnetic field is not disturbed and voltage V1 across capacitor C1, or an image of the current in the oscillating circuit of the reader, takes a value $V1_{IDLE}$, called idle value, during frame T. Idle value means a value corresponding to a time when no transponder is present in the field.

When a transponder is present in the electromagnetic field, a voltage develops across its oscillating circuit. On the reader side, the power sampling by the transponder reflects as a lowering of the current in the oscillating circuit, and thus of voltage V1 down to a threshold detection value $V1_{DET}$. Such a variation is detected by the reader, which can then start a communication with the transponder. Such a communication starts with a process for determining the type of transponder present in the field of the reader, that is, an identification of the type of modulation to be used for the transmission. This phase, generally called activity loop (AL) and defined, for example, as a polling loop in the NFC-Forum Activity 1.0 specification, is illustrated by a block in the timing diagram of FIG. 3A.

The detection of the lowering of voltage V1 is for example performed by a dedicated transponder detection circuit (Tag Detector) having the function of detecting a disturbance of the field emitted by device 1, that is, in practice, the presence of an antenna in its field.

Figure 4:
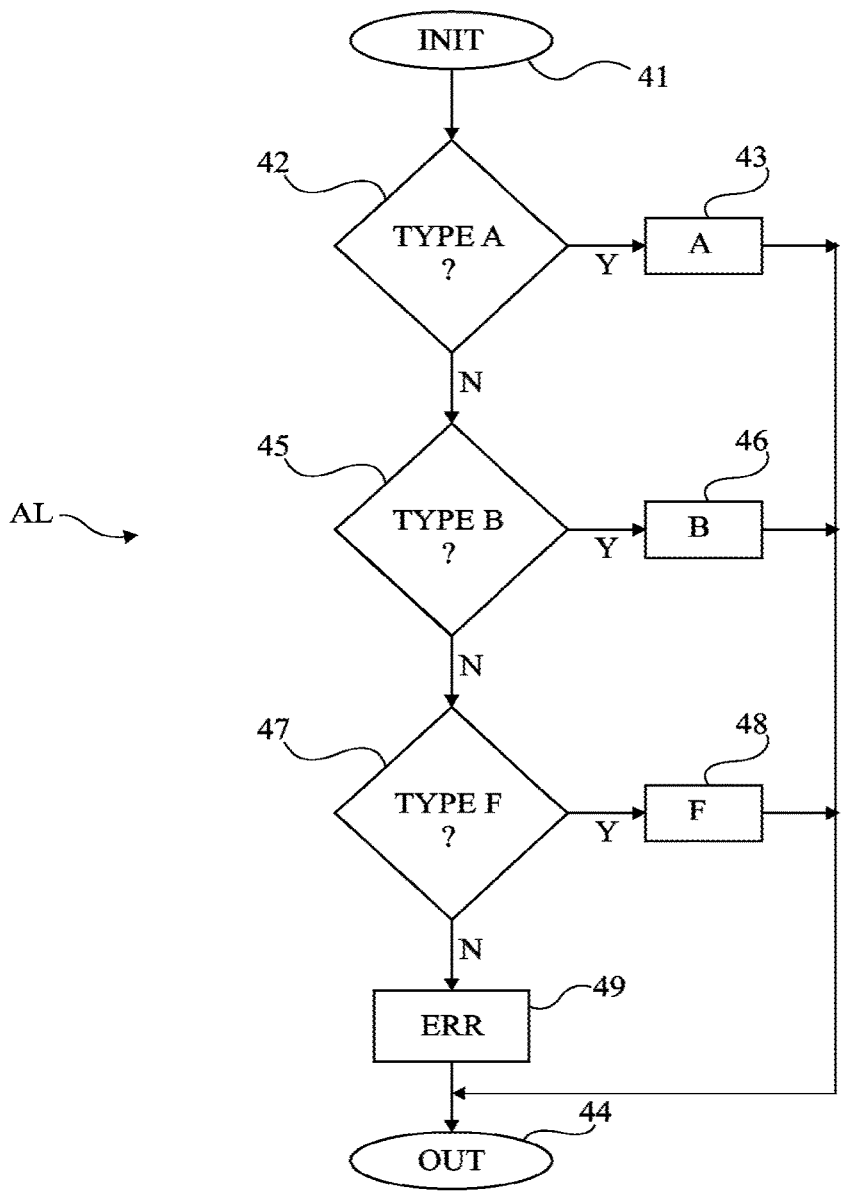
FIG. 4 is a timing diagram of an example of configuration of the type of modulation of a near-field communication router.

FIG. 4 is a simplified block diagram of the steps of a phase for determining the transponder type (Activity Loop) which follows the detection of the presence of a transponder.

After a step 41 of initialization (INIT) of different variables, the reader starts by sending a request according to a first modulation type, and then, in the absence of any response from the transponder, switches to another type, and so on.

In NFC routers, radio communications are based on standards respecting a carrier frequency of approximately 13.56 MHz. Transmissions from the terminal to the transponder are mainly amplitude-modulated according to four families or types set by ISO standard 14443, designated as TYPE A, TYPE B, TYPE F, and 15693. The different types can be distinguished, among others, by the transmission rate, the carrier modulation index, and the data coding.

In the example of FIG. 4, the terminal starts by emitting in type A and watches whether it receives a response from the transponder (block 42, type A?). If it does, (output Y of block 42), it configures its modulator for type A (block 43, A) and the activity loop stops (block 44, OUT) and the transmission can start. If the transponder does not respond to the type-A modulation (and is thus not compatible with this type of modulation), the terminal or reader attempts to communicate by using type B (block 45, type B?). If it receives a response (output Y of block 45), it configures its modulation for type B (block 46, B) and the transmission can start. If it does not (output N of block 45), it attempts to communicate by using type F (block 47, type F?). If the transponder accepts type F (output Y of block 47), the terminal switches to this type of modulation (block 48, F). If it does not (output N of block 47), the terminal considers that the transmission cannot be established (block 49, ERR) and returns to an initial polling frame generation state T.

Other methods for determining the modulation type may be used in an activity loop. For example, the activity loop may start with an attempt to detect a type B or a type F.

Such a configuration is not capable of configuring two mobile devices and their NFC routers for a peer-to-peer operation (P2P).

In a peer-to-peer communication, and especially a communication in so-called passive peer-to-peer mode between two devices, one is called "initiator" (that which desires to send a file to the other) and the other is called "target". The communication respects the reader-card operation, that is, one of the two devices operates in reader mode and the other operates in card mode. To simplify the following description, initiator 1 is considered as being configured in reader mode and target 1' is considered as being configured in card mode. However, the inverse is possible.

Peer-to-peer communications are desired according to type F. Indeed, most telecommunications operators do not desire for a peer-to-peer communication to be established according to type A or B. Now, with usual activity loops, if the device in card mode responds on type A and does not support protocol ISO-18092 (output Y of block 42), the configuration loop stops and there is no way to switch to another standard. The peer-to-peer communication is then impossible.

Even by starting a configuration phase on a type-B detection, the problem remains the same: in the case where the modulation on type B or on type A is accepted, the configuration will not reach type F.

Only by starting a phase on type F can a target accepting a peer-to-peer communication be identified. This would however exclude other type-F communications.

The inventors have observed that, on the card-mode device side, a peer-to-peer communication would generate another functional difference. Indeed, for a reader-card communication, the device operating in card mode is generally remotely supplied by the reader. Conversely, the peer-to-peer mode is generally only available if the devices draw the power necessary to their operation from their respective batteries.

Thus, it is provided that a first device (initiator or emitter) desiring to send a file in peer-to-peer mode to a second device (target or receiver) starts by verifying whether the target draws power from the generated field.

FIG. 5 is a simplified block diagram of an embodiment of such a starting phase.

After an initialization phase (block 51, INITI), the device operating in reader mode emits an electromagnetic field and watches whether the distant device consumes power or not (block 52, CONSO?). This amounts to determining, for example, whether voltage V1 across the capacitor of its oscillating circuit remains approximately at the level of antenna detection threshold value $V1_{DET}$ or decreases down to a threshold $V1_{USE}$ corresponding to a usage value. More generally, such a determination is performed on information representative of the current in the oscillating circuit of the reader.

In the presence of power consumption by the device in card mode (output Y of block 52), for example detected by the fact that voltage V1 is lower than threshold $V1_{USE}$, this means that the device is not configured for a peer-to-peer mode. A usual activity loop (block 53, AL), for example, of the type illustrated in FIG. 4, is then carried out.

In the absence of power consumption detected at block 52 (output N), for example detected by the fact that voltage V1 ranges between thresholds $V1_{USE}$ and $V1_{DET}$, this means that the target device is powered by its battery. It can be deduced that it is configured for a peer-to-peer transmission. Initiator 1 (block 54, P2P) then starts a peer-to-peer (P2P) communication.

According to a variation illustrated in dotted lines, initiator 1 which desires to start a peer-to-peer communication is initially configured for a transmission according to type F (block 55, TYPE F). This simplifies subsequent processings.

FIGS. 6A and 6B illustrate the operation of the method of FIG. 5 in the case where the target device is ready for a peer-to-peer communication.

FIGS. 7A and 7B illustrate this operation in the opposite case.

FIGS. 6A and 7A are timing diagrams schematically illustrating the value of voltage V1. FIGS. 6B and 7B are timing diagrams illustrating the corresponding processes implemented from the point of view of configuration CONF of the transmission type.

In the left-hand portion of these timing diagrams, the variation according to which the emitter device is pre-configured with TYPE F has been illustrated in dotted lines (block 55, FIG. 5).

In FIGS. 6A and 6B, device 1' uses the power of its battery. During polling frames T, voltage V1 is influenced by the presence of the antenna (lower than level $V1_{DET}$), but remains higher than threshold $V1_{USE}$. Accordingly, on the side of device 1, it is known that a Type-F communication will be started in peer-to-peer mode. The configuration is performed correspondingly (right-hand portion of timing diagrams 6A and 6B).

In the case of FIGS. 7A and 7B, device 1' samples power from the field emitted by device 1. Accordingly, voltage V1 falls below threshold $V1_{USE}$, which enables to detect that the communication will not be of P2P type. In this case, device 1 starts a usual configuration loop of activity loop (AL) type.

An advantage of the described embodiments is that it is now possible to identify a peer-to-peer communication for a correct configuration of a mobile telecommunication device equipped with an NFC router.

Various embodiments have been described. Various alterations and modifications will occur to those skilled in the art. In particular, although reference has been made to the level of voltage V1, any other quantity enabling the terminal to detect whether the target device uses or not its battery may be used. For example, the results provided by a circuit for detecting a current variation in the antenna may be used. Further, the practical implementation of the described embodiments is within the abilities of those skilled in the art based on the functional indications given hereabove and by using usual computer tools for parameterizing the terminals. Indeed, the implementation of these embodiments requires no structural modification of mobile telecommunication devices.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method, comprising:
   determining, by a first near-field communication device in reader mode, whether a second near-field communication device is self-powered; and
   selecting, by the first near-field communication device, a mode of communication with the second near-field communication device based on the determination of whether the second near-field communication device is self-powered, wherein the determining whether the second near-field communication device is self-powered comprises determining whether the second near-field communication device is extracting power from a communication field generated by an oscillating circuit of the first near-field communication device by measuring a voltage in the oscillating circuit, the voltage being representative of a current in the oscillating circuit, wherein
   when a value of said measured voltage is lower than a transponder-detection voltage threshold and higher than a power-extraction voltage threshold, the second near-field communication device is determined to be self-powered and a peer-to-peer mode of communication is selected by the first near-field communication device; and
   when the value of said measured voltage is lower than both the transponder-detection voltage threshold and the power-extraction voltage threshold, the second near-field communication device is determined not to be self-powered and another mode of communication is selected, said another mode of communication comprising:
      emitting, by the first near-field communication device, frames according to different modulation types; and
      monitoring, by the first near-field communication device, a response of the second near-field communication device to the emitted frames.

2. The method of claim 1, comprising:
   setting a default communication mode of the first near-field communication device to type-F modulation.

3. A near-field communication device, comprising:
   an oscillating circuit, which, in operation, generates a communication field; and
   processing circuitry coupled to the oscillating circuit, wherein the processing circuitry, in operation:
      determines whether a second near-field communication device is self-powered; and
      selects a mode of near-field communication with the second near-field communication device based on the determination of whether the second near-field communication device is self-powered, wherein the determining whether the second near-field communication device is self-powered comprises determining whether the second near-field communication device is extracting power from the communication field by measuring a voltage in the oscillation circuit representative of a current in the oscillation circuit, wherein, the processing circuitry, in operation,
   in response to a value of said measured voltage being lower than a transponder-detection voltage threshold and higher than a power-extraction voltage threshold, determines the second near-field communication device to be self-powered and selects a peer-to-peer mode of communication of the near-field communication device; and
   in response to the value of said measured voltage being lower than both the transponder-detection voltage threshold and the power-extraction voltage threshold, determines the second near-field communication device not to be self-powered and selects another mode of communication, said another mode of communication comprising:
      emitting frames according to different modulation types; and
      monitoring a response of the second near-field communication device to the emitted frames.

4. The device of claim 3 wherein, in operation, the processing circuitry selects an initial communication mode of type-F modulation.

5. The device of claim 3, comprising:
   a battery; and
   a touchscreen.

6. A device, comprising:
   one or more inputs to couple to an oscillating circuit; and
   processing circuitry coupled to the one or more inputs, wherein the processing circuitry, in operation:
      determines whether a second near-field communication device is self-powered; and
      selects a mode of near-field communication with the second near-field communication device based on the determination of whether the second near-field communication device is self-powered, wherein the determining whether the second near-field communication device is self-powered comprises determining whether the second near-field communication device is extracting power from a communication field, generated by the oscillating circuit, by measuring a voltage in the oscillating circuit representative of a current in the oscillation circuit, wherein the processing circuitry, in operation,
   in response to a value of said measured voltage being lower than a transponder-detection voltage threshold and higher than a power-extraction voltage threshold, determines the second near-field communication device to be self-powered and selects a peer-to-peer mode of communication of the near-field communication device; and
   in response to the value of said measured voltage being lower than both the transponder-detection voltage threshold and the power-extraction voltage threshold, determines the second near-field communication device not to be self-powered and selects another mode of communication, said another mode of communication comprising:
      emitting frames according to different modulation types; and
      monitoring a response of the second near-field communication device to the emitted frames.

7. The device of claim 6 wherein, in operation, the processing circuitry selects an initial communication mode of type-F modulation.

8. A near-field communication device, comprising:
   an oscillating circuit, which, in operation, generates a communication field; and
   processing circuitry coupled to the oscillating circuit, wherein the processing circuitry, in operation:

determines whether a second near-field communication device is extracting power from the communication field by measuring a voltage in the oscillating circuit representative of a current in the oscillation circuit; and selects a mode of near-field communication with the second near-field communication device based on the determination of whether the second near-field communication device is extracting power from the communication field, wherein, the processing circuitry, in operation, in response to a value of said measured voltage being lower than a transponder-detection voltage threshold and higher than a power-extraction voltage threshold, determines the second near-field communication device to be self-powered and selects a peer-to-peer mode of communication of the near-field communication device; and in response to the value of said measured voltage being lower than both the transponder-detection voltage threshold and the power-extraction voltage threshold, determines the second near-field communication device not to be self-powered and selects another mode of communication, said another mode of communication comprising:

emitting frames according to different modulation types; and monitoring a response of the second near-field communication device to the emitted frames.

9. The near-field communication device of claim 8 wherein the near field communication is selected from a peer-to-peer mode and a reader mode.

10. The near-field communication device of claim 3 wherein the mode of near field communication is selected from a peer-to-peer mode and a reader mode.

11. The near-field communication device of claim 6 wherein the mode of near field communication is selected from a peer-to-peer mode and a reader mode.

\* \* \* \* \*